(12) United States Patent
Glazebrook

(10) Patent No.: US 9,675,044 B2
(45) Date of Patent: Jun. 13, 2017

(54) ANIMAL ENRICHMENT DEVICES

(71) Applicant: Mark Glazebrook, Vermont (AU)

(72) Inventor: Mark Glazebrook, Vermont (AU)

(73) Assignee: Mark Glazebrook, Vermont (AU)

( * ) Notice: Subject to any disclaimer, the term of this patent is extended or adjusted under 35 U.S.C. 154(b) by 0 days.

(21) Appl. No.: 14/024,754

(22) Filed: Sep. 12, 2013

(65) Prior Publication Data

US 2014/0069338 A1    Mar. 13, 2014

(30) Foreign Application Priority Data

Sep. 13, 2012    (AU) ................................ 2012903995

(51) Int. Cl.
*A01K 5/00*      (2006.01)
*A01K 15/02*     (2006.01)

(52) U.S. Cl.
CPC .............. *A01K 5/00* (2013.01); *A01K 15/025* (2013.01); *A01K 15/027* (2013.01)

(58) Field of Classification Search
CPC ...... A01K 1/105; A01K 15/02; A01K 15/027; A01K 15/025; A01K 5/0114; A01K 5/0233; A01K 5/0275; A01K 15/026
USPC ......... 119/51.01, 61.54, 61.5, 702, 709–712, 119/707, 53.5, 56.1, 57.91, 51 R, 54, 119/56 R; 222/548, 485, 410, 367, 167, 222/43, 49, 50, 217, 222, 242, 239, 305, 222/307, 308, 339, 361, 362, 370, 284; 446/236, 475; 221/265, 264
See application file for complete search history.

(56) References Cited

U.S. PATENT DOCUMENTS

| | | | |
|---|---|---|---|
| 3,033,164 A * | 5/1962 | Evers | A01K 5/025 119/54 |
| 3,476,086 A | 11/1969 | Way | |
| 3,581,949 A * | 6/1971 | Conrad | A47F 1/035 222/167 |
| 3,830,202 A | 8/1974 | Garrison | |
| 4,322,017 A * | 3/1982 | Lowdermilk | G01F 11/24 222/217 |
| 4,823,738 A * | 4/1989 | Gold | A01K 5/0114 119/51.01 |
| 5,092,272 A | 3/1992 | O'Rouke | |
| 5,474,032 A | 12/1995 | Krietzman | |
| 5,575,241 A | 11/1996 | Line | |
| 5,685,461 A * | 11/1997 | Mitchell | G01F 11/18 222/184 |
| 6,546,896 B1 | 4/2003 | Markham | |
| 6,575,119 B1 | 6/2003 | Lonsway | |
| 7,900,584 B2 | 3/2011 | Suring | |

(Continued)

*Primary Examiner* — Peter M Poon
*Assistant Examiner* — Magdalena Topolski
(74) *Attorney, Agent, or Firm* — Landmark Intellectual Property Law, PLLC

(57) ABSTRACT

An animal enrichment device that includes a support coupled to a base and a mobile member coupled to the support such that the mobile member can move relative to the base and/or the support. The mobile member includes at least one food retaining element, which provides a first mode of food release. The mobile member and/or the support is at least partially hollow for storing food therein. Efforts by the animal to remove food from the at least one food retaining element will cause the mobile member to move relative to the base and intermittently release the food stored within the mobile member and/or the support, which provides a second mode of food release.

18 Claims, 6 Drawing Sheets

(56) References Cited

U.S. PATENT DOCUMENTS

| | | | | |
|---|---|---|---|---|
| 2001/0037773 A1* | 11/2001 | Nathanson | ............ | A01K 15/025 119/707 |
| 2006/0194504 A1* | 8/2006 | Ragonetti | ............ | A01K 15/025 446/46 |
| 2008/0083378 A1* | 4/2008 | Pearce | ................. | A01K 15/025 119/707 |
| 2008/0178813 A1* | 7/2008 | Lescroart | ............. | A01K 5/0114 119/51.01 |
| 2009/0217885 A1* | 9/2009 | Peter | .................... | A01K 15/026 119/709 |
| 2009/0314221 A1* | 12/2009 | Wang | ................... | A01K 15/025 119/707 |
| 2010/0077963 A1* | 4/2010 | Lipscomb | ............ | A01K 5/0142 119/54 |
| 2011/0297093 A1* | 12/2011 | Lai | ....................... | A01K 5/0225 119/54 |
| 2013/0139756 A1* | 6/2013 | Miebach | ................ | A01K 15/02 119/51.01 |
| 2014/0060441 A1* | 3/2014 | Baxter | ................. | A01K 5/0275 119/61.5 |
| 2014/0261194 A1* | 9/2014 | Cloutier | ............... | A01K 15/025 119/51.01 |
| 2015/0101543 A1* | 4/2015 | Baxter | ................. | A01K 5/0114 119/498 |
| 2015/0230429 A1* | 8/2015 | Mak | .................... | A01K 15/026 119/709 |

\* cited by examiner

ANIMAL ENRICHMENT DEVICES

RELATED APPLICATIONS

The present application is claims priority to Australian Patent Application No. 2012903995, filed on Sep. 13, 2012, entitled "Animal Enrichment Device." This application is incorporated herein by reference in its entirety.

FIELD OF INVENTION

The present invention relates to the field of animal enrichment devices including animal toys and animal feeders. In particular the present invention relates to the field of animal toys for enriching the environment in which the animal lives.

In one particular aspect the present invention is suitable for use as an amusement for animals, particularly domestic animals left alone for periods of time.

It will be convenient to hereinafter describe some embodiments of the invention in relation to dogs, however it should be appreciated that the present invention is not limited to dogs and can be used for the amusement and enrichment of a wide range of animals such as captive animals, domestic animals and wild animals.

BACKGROUND OF THE INVENTION

It is to be appreciated that any discussion of documents, devices, acts or knowledge in this specification is included to explain the context of the present invention. Further, the discussion throughout this specification comes about due to the realisation of the inventor and/or the identification of certain related art problems by the inventor. Moreover, any discussion of material such as documents, devices, acts or knowledge in this specification is included to explain the context of the invention in terms of the inventor's knowledge and experience and, accordingly, any such discussion should not be taken as an admission that any of the material forms part of the prior art base or the common general knowledge in the relevant art in Australia, or elsewhere, on or before the priority date of the disclosure and claims herein.

Enrichment of the environment in which an animal lives is essential to their physical and psychological health and wellbeing, particularly for domestic and captive animals. This is as important for captive zoo animals as it is for domestic pets such as dogs. Conscientious animal carers provide animal enrichment by providing opportunities for exercise, satisfying their 'behavioural needs' and optimising the level of stimulation they receive. Animals that do not have adequate enrichment can develop abnormal behaviours. For example, a bored dog will seek and find ways to amuse themself that will be viewed as a nuisance by their owner and neighbours, including pulling and chewing washing on a clothesline, barking or digging up plants in a garden. This type of behaviour, in combination with call outs to the local council or animal authorities and the need for conflict resolution with neighbours often prompts owners to provide enrichment for their dogs. The problem is exacerbated by increasing numbers of animals living in confined spaces over long periods within medium and high density apartments.

Examples of enrichment provided by owners of domestic animals include:
a. A digging pit for hiding bones, treats or favourite toys to encourage digging in a chosen location;
b. A wading pool, particularly for water loving dogs;
c. Ice blocks with favourite treats or toys in them;
d. Treasure hunts comprising treats hidden around the yard for the pet to find;
e. Boxes enclosing food or toys, or arranged as obstacles;
f. A viewing area for the pet to see what is happening outside the yard; and/or
g. Toys such as KONG™, BUSTER CUBE™, HOME ALONE™ toys or feeder balls.

Provision of dog toys is a particularly popular option but it is difficult to ensure that the dog's toys remain novel. Most owners have to remove them after a day and return them to the dog at a later time, such as in one week, so they remain new and exciting or alternatively provide the dog with different toys. Animal carers also have to be careful that the toy does not compromise their pet's safety and will not cause problems if consumed.

Accordingly a wide range of dog toys are available to take advantage of dogs' enjoyment of activities such as chasing, catching and pulling objects. These activities are often even more enjoyable if the object has eccentric or unpredictable motion.

For example, many dog toys are designed for tug-of-war, typically with an owner or another dog. These types of toys are disclosed for example in U.S. Pat. No. 5,092,272, U.S. Pat. No. 3,830,202 and U.S. Pat. No. 3,476,086.

Another type of dog toy utilises an object suspended from a post or frame on a rope or elastic cord. For example, dog toys of this type are disclosed in U.S. Pat. No. 5,575,241, U.S. Pat. No. 5,474,032, and U.S. Pat. No. 6,575,119. U.S. Pat. No. 6,575,119 discloses a suspended dog amusement apparatus, system and method for amusing and exercising dogs. The system is relatively complex, requiring a bar, a first suspension element for suspending the bar from a horizontal member at a support point on the bar, a weight element secured to the bar that applies a first gravitational torque to the bar about the support point and a second suspension element secured to the bar that comprises a strand-like member attached to a resilient dog toy and which produces a second gravitational torque to the bar about the support point. The suspended dog toy has random and unpredictable motion when touched.

A similar type of animal toy is disclosed in U.S. Pat. No. 7,900,584 which relates to a device having a moveable pendulum shaft secured within a housing, the pendulum being capable of carrying multiple toys, each toy being accessible through access openings in the housing.

Another type of dog toy relies upon odours, food or flavourings to hold the dog's interest. For example U.S. Pat. No. 6,546,896 relates to an animal toy having a plurality of irregular features on the outer surface which stimulates cleaning of the dog's teeth and gums, and allows food treats to be placed in the irregular features.

However there is an ongoing need for new durable animal toys that engage an animal in stimulating activities that substitute for the lack of interaction and stimulation that can contribute to abnormal and/or destructive behaviour.

OBJECT OF INVENTION

A preferred object of the present invention is to provide an animal enrichment device, such as an animal toy that enriches the animal's living environment by providing challenges.

A further preferred object of the present invention is to alleviate at least one disadvantage associated with the related art.

It is a preferred object of the embodiments described herein to overcome or alleviate at least one of the above noted drawbacks of related art systems or to at least provide a useful alternative to related art systems.

SUMMARY OF INVENTION

In its simplest embodiment the present invention includes a mobile member that retains food and moves relative to a support to engage the attention of an animal for extended periods of time.

In a first aspect of embodiments described herein, although not necessarily the broadest aspect, there is provided an animal enrichment device comprising: a support; a mobile member attached to the support; and at least one food retaining element associated with the mobile member; wherein efforts by the animal to remove food from the food retaining element will cause the mobile member to move relative to the support.

Typically the device of the present invention is used for multiple small portions of food that the animal likes to eat. In a preferred embodiment the device retains food treats such as small pieces of meat, animal biscuits or kibbles, cheese or bread. The food retaining elements may have any conformation that is convenient or appropriate for the food treat, the type of animal, and level of difficulty required.

Preferably the food retaining elements will hold the food treat in a manner that challenges the animal to figure out how to remove it. It is important however that the challenge keeps their interest, but is not so difficult that the animal becomes frustrated at their inability to access the treat. For example, the food retaining elements may consist of a recess, peg, clip notch, irregular feature or any other convenient fastener. The food retaining elements may be shaped to provide a multitude of contact surfaces which allow the gums and teeth of the animal to be cleaned while they attempt to remove the food treat.

While the food retaining elements are principally associated with the mobile member, additional food retaining elements may be associated with the support for extra points of interest for the animal. The additional elements distinguish the present invention from prior art by presenting the animal with a dual treat system that rewards effort whilst sustaining interest over time.

Typically the mobile member moves when touched by the animal. In one embodiment the mobile member is provided with additional motive force by a small solar powered or battery/inertia powered mechanism. Preferably the mobile member moves in an unpredictable or random manner in response to efforts by the animal to remove food. Optimally the animal will quickly smell the food treat and when trying to extract the treats the animal will engage in problem solving through movement and learn different techniques (eg head and foot placement, teeth and jaw positioning) to maximise access to the food treats.

The mobile member may have any convenient shape or conformation. The mobile member may be attached to the support by any suitable fastener or connector, such as a bolt or screw that acts as a pivot or axle about which the mobile member may move. Typically the fastener or connector can be adjusted to increase or decrease the amount of movement of the mobile member or the amount of pressure an animal needs to apply to move the mobile member. Thus the device can be adapted for the amount of force applied by a large active animal such as a boisterous boxer dog as compared with a smaller animal such as a dachshund.

In some embodiments, the support is intended to raise the mobile member above the ground level so that the animal can also engage at a standing position on hind legs. Suitably the mobile member also has food retaining elements at various positions so that the mobile member presents the food treats at different height levels as it moves. This is in contradistinction to a Kong™ or other treat-containing animal toys of the prior art which are used at ground level (requiring the animal to stoop or lie down) and require relatively little skill and minimal engagement. These types of toys are also immobile or move in a predictable manner, with saliva on the toy collecting debris as they roll.

In another aspect of embodiments described herein, although not necessarily the broadest aspect, there is provided an animal enrichment device comprising: a base; a support coupled to the base; and a mobile member coupled to the support, the mobile member comprising at least one food retaining element; wherein efforts by the animal to remove food from the at least one food retaining element will cause the mobile member to move relative to the support and intermittently release food from within the mobile member.

Suitably, the base comprises at least one channel and the mobile member comprises at least one aperture wherein alignment of the at least one aperture with the at least one channel allows release of food stored within the mobile member.

Suitably, the mobile member has a substantially conical shape.

In a further aspect of embodiments described herein, although not necessarily the broadest aspect, there is provided an animal enrichment device comprising: a base; a support coupled to the base; and a mobile member coupled to the support such that the mobile member is movable relative the base; wherein the mobile member comprises at least one food retaining element to provide a first mode of food release; and wherein efforts by the animal to remove food from the at least one food retaining element will cause the mobile member to move relative to the base and intermittently release food stored within the mobile member to provide a second mode of food release.

In a yet further aspect of embodiments described herein, although not necessarily the broadest aspect, there is provided an animal enrichment device comprising: a base; a support coupled to the base; and a mobile member coupled to the support such that the mobile member is movable relative the base; wherein the mobile member comprises at least two food retaining elements and efforts by the animal to remove food from at least one of the food retaining elements will cause the mobile member to move relative to the base and release food stored within the support via another of the food retaining elements.

Preferably the design and material of manufacture for the device of the present invention will be animal appropriate. Suitably it will require an appropriate level of skill from the animal, have low predictability in its motion and provide a high level of engagement for an extended period of time. According to some embodiments, the device must be set at an appropriate height, sufficiently robust and of appropriate conformation for the animal. For example, a large dog will require a stronger, taller and more robust device than a small dog or cat. Furthermore, it must be appropriate to the activity level and skill of the animal and the type of things that interest it. For example if the device is to be provided to a highly intelligent, highly dextrous and active captive animal such as a monkey, it must require a high level of skill and physical engagement to remove the treats and be extremely resilient or the animal will disassemble it.

It is also important that the device is not made of materials that will make the animal sick if ingested, and that there are no small parts that are harmful if swallowed.

In another aspect of embodiments described herein there is provided a method of animal enrichment comprising the step of providing an animal with access to the device of the present invention.

Other aspects and preferred forms are disclosed in the specification and/or defined in the appended claims, forming a part of the description of the invention.

In essence, embodiments of the present invention comprising the dual treat feature and dynamic/random movement stem from the realization that an animal's interest can be engaged for extended periods of time by combining unpredictable movement of a mechanical device with an animal's drive for food.

Advantages provided by the devices of the present invention include one or more of the following depending on the particular embodiment:
 a. Can be adapted for a wide range of captive, domestic and/or wild animals;
 b. Suitable for a wide range of settings including indoors/confined apartments, home yards or gardens, animal boarding establishments, zoos, vet clinics et cetera;
 c. Provides enrichment to divert animals from otherwise abnormal or destructive behaviour;
 d. Can be manufactured to a high standard or durability—to withstand long periods of chewing and pulling;
 e. Engages an animal mentally and physically, causing them to combine mental strategy with physical agility;
 f. Has a function that is easily understood or learnt by the animal;
 g. An engagement height consistent with an animal standing on all four legs or in a natural upright position; and/or
 h. Treats elevated from the ground to ensure that animals are not eating debris and that the treats do not become contaminated.

Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the scope of the disclosure herein will become apparent to those skilled in the art from this detailed description.

BRIEF DESCRIPTION OF THE DRAWINGS

Further disclosure, objects, advantages and aspects of preferred and other embodiments of the present application may be better understood by those skilled in the relevant art by reference to the following description of embodiments taken in conjunction with the accompanying drawings, which are given by way of illustration only, and thus are not limitative of the disclosure herein, and in which.

Figure 1:
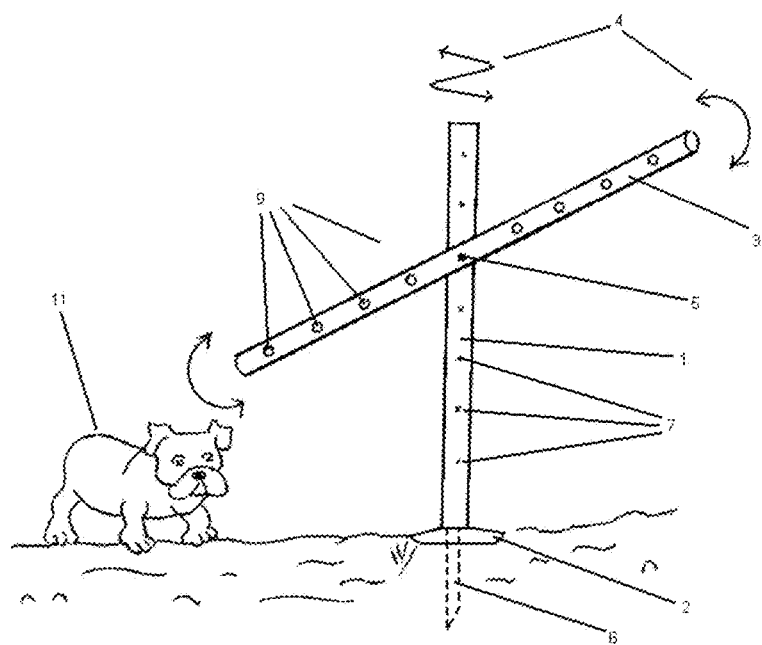
FIG. 1 illustrates a first embodiment of the device of the present invention having a mobile member that can rotate like the arms of a windmill.

Skilled addressees will appreciate that elements in the drawings are illustrated for simplicity and clarity and have not necessarily been drawn to scale. For example, the relative dimensions of some of the elements in the drawings may be distorted to help improve understanding of embodiments of the present invention.

DETAILED DESCRIPTION

FIG. 1 depicts one embodiment of a device according to the present invention comprising an elongate support (1) in the form of a post set in the ground with a flat base (2) and/or spike (6), and a mobile member (3) attached to the support (1) at a bolt (5) about which the mobile member (3) can rotate in the direction of the arrows. While this embodiment uses a post as a support (1), it will be readily appreciated that the support may be of any convenient shape or conformation. Furthermore, while this embodiment uses a mobile member (3) that is elongate, it will be readily appreciated that alternative versions of the mobile member may be used, such as a multiple spokes, a spoked wheel or a disk. In the embodiment illustrated, the height of the mobile member (3) above the ground can be altered by shifting it with the bolt (5) to one of the other bolt holes (7) on the support (1). For example the height can be adjusted to an appropriate level for the size of the animal. The mobile member (3) includes a plurality of food retaining elements (9) comprising recesses into which small morsels of food may be placed. The food may be anything that the animal enjoys eating such as dry food, biscuits, bread, hard meat, soft meat or cheese compacted into the recesses. Each time the animal (11) attempts to pull the food out of a recess, the mobile member (3) will rotate in a vertical plane as well as horizontal plane (4). The more the animal pulls or licks at the food the more the mobile member (3) will rotate. If the animal (11) is to succeed, it will need to use various strategies involving standing, using its legs, paws and/or body to hold the mobile member (3) while it licks or chews at the food. Different strategies will need to be used depending on how far along the mobile member (3) the food retaining elements (9) are located.

Figure 2:
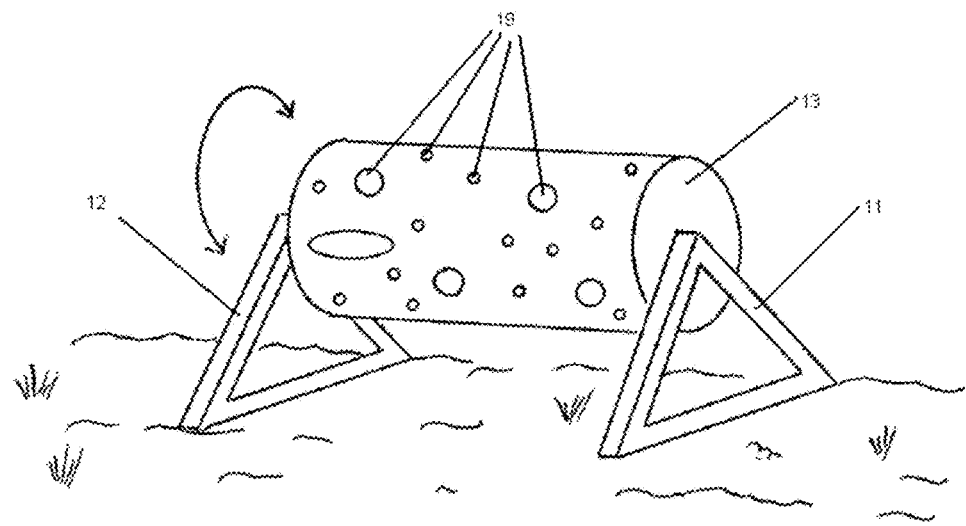
FIG. 2 illustrates a second embodiment of the device of the present invention having a mobile member in the form of a horizontally oriented rotating barrel.

FIG. 2 depicts a further embodiment of a device according to the present invention comprising triangular supports (11,12) resting on the ground and pivotally supporting either end of a barrel shaped mobile member (13) that rotates about its longitudinal axis in the direction of the arrows. The mobile member (13) includes a plurality of food retaining elements (19) of various sizes and shapes comprising recesses into which small morsels of food may be placed. Each time the animal (11) attempts to pull the food out of a recess, the mobile member (3) will roll. An animal will need to use various strategies to get the food out of the different shaped retaining elements (19) while the barrel rolls.

Figure 3:
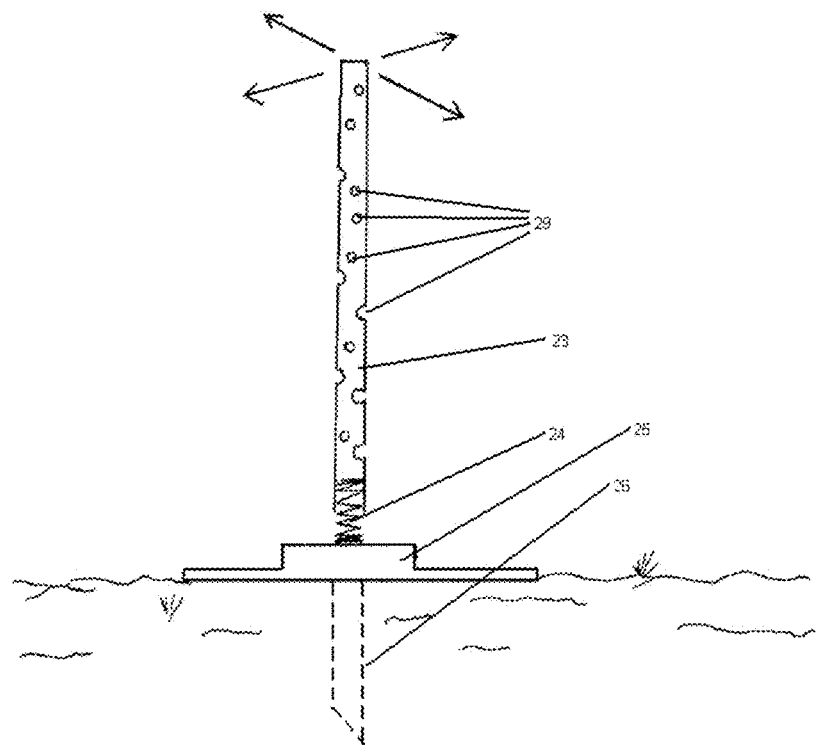
FIG. 3 illustrates a third embodiment of the device of the present invention having a mobile member in the form of a vertical pole.

FIG. 3 depicts another embodiment of a device according to the present invention comprising a support having a flat base (25) and optional ground spike (26) which may be weighted. A biasing means (24) in the form of a coil spring projects upwards from the base (25) and/or spike (26). In this embodiment the mobile member (23) comprises an elongate post supported on the biasing means (24), which allows the mobile member (23) to lean or rotate in the direction of the arrows. The mobile member (23) includes a plurality of food retaining elements (29) distributed over a range of heights and comprising recesses into which small morsels of food may be placed. Each time an animal attempts to pull the food out of a recess, the mobile member (23) will lean or rotate. Each time the animal attempts to win some food it will need to use a different strategy to cope with the movement of the mobile member (23) while it licks or chews at the food. Different strategies will need to be used depending on how far along the mobile member (23) the food retaining elements (29) are located.

Figure 4:
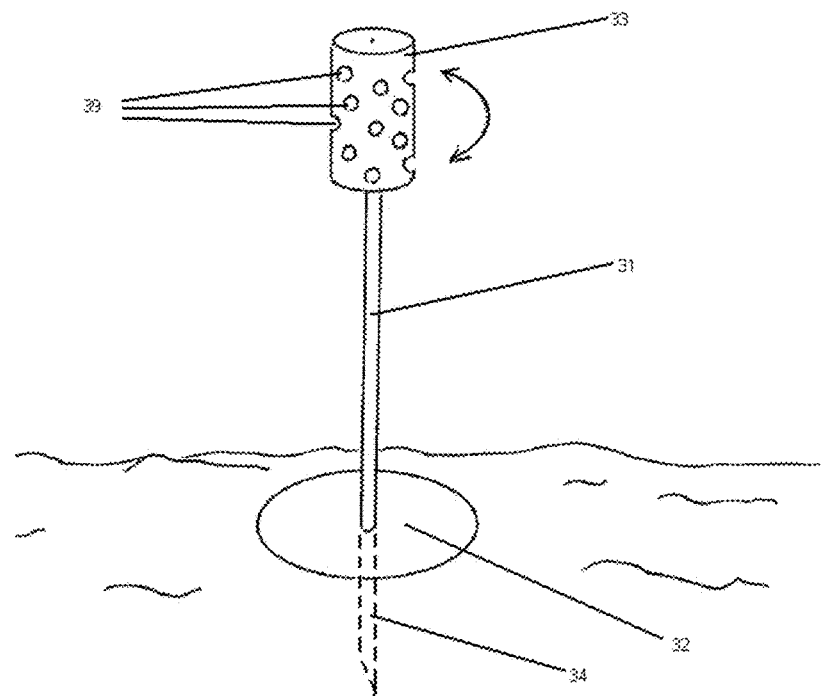
FIG. 4 illustrates a fourth embodiment of the device of the present invention having a mobile member in the form of a vertically oriented rotating barrel.

FIG. 4 depicts another embodiment of a device according to the present invention comprising an elongate support (31) in the form of a vertical post set on a flat base (32) and/or ground spike (34), and a mobile member (33) in the form of a small barrel attached to the upper end of the support (31). The mobile member (33) rotates around its longitudinal axis in the direction of the arrows. The mobile member (33) includes a plurality of food retaining elements (39) comprising recesses into which small morsels of food may be placed. The more an animal attempts to pull the food out of a recess, the more the mobile member (33) will rotate unless the animal figures out a strategy to hold the mobile member (33) while it licks or chews at the food. Mobile members comprising recesses are particularly preferred because they are relatively easy to clean for example, with a hose or by soaking.

Figure 5:
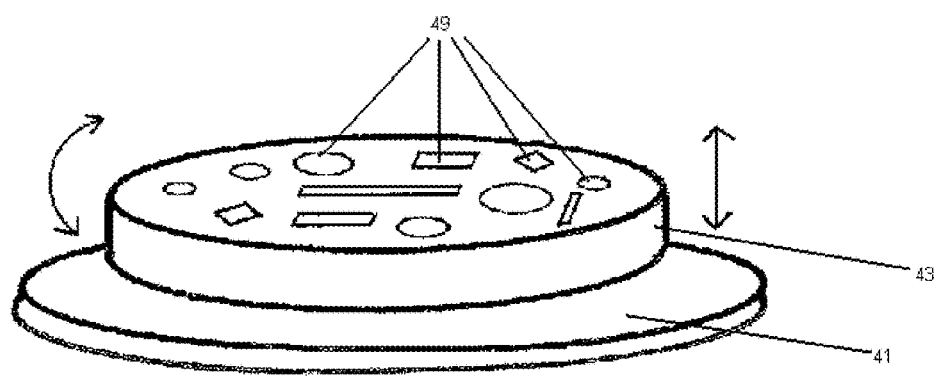
FIG. 5 illustrates a further embodiment of the device of the present invention having a mobile member in the form of a resilient cushion that may also rotate.

FIG. 5 depicts another embodiment of a device according to the present invention comprising a flat, circular disk shaped support (41) that can rest on a surface, and a mobile member (43) attached to the support (41). The mobile member (43) is elastically resilient, like a cushion, and can move vertically up and down in the direction of the arrow. In this embodiment the mobile member includes a noise making device that makes a squeaky noise each time an animal steps on the mobile member (43). In one preferred embodiment the mobile member (43) is pivotally attached to the support (41) and can alternatively (or additionally) rotate in the horizontal plane in the direction of the other arrow. The mobile member (43) includes a plurality of food retaining elements (49) comprising recesses of various shapes and sizes into which small morsels of food may be placed. Each time an animal steps on the mobile member (43) it moves downwards and makes a squeaky noise. The more the animal moves about the more noise it makes. If the mobile member (43) also rotates, the animal will need to use various strategies to liberate food from the retaining elements.

FIGS. 6-11 depict other embodiments of a device (50) according to the present invention comprising a support (51) coupled to a substantially circular flat base (55) and a mobile member (53) having a substantially conical shape and coupled to the support (51). In this embodiment, the support (51) extends upwardly from the base (55). Mobile member (53) comprises a hollow central sleeve (61) through which support (51) passes. Hence, mobile member (53) is rotatably mounted on the support (51) and the mobile member (53) can rotate about the support (51) relative to the flat base (55). Mobile member (53) comprises one or more food retaining elements (59) into which food can be inserted and retained until extracted by the animal through playing with the device (50). This is a first mode of food release in this embodiment.

In the embodiments shown in FIGS. 6-11, four food retaining elements (59) are provided part way up a sloping surface (52) of the mobile member (53) at equal spaces around the circumference of the mobile member. In this embodiment, food retaining elements (59) are in the form of tapered recesses such that food can be wedged therein and thus provide the animal with a challenge in extracting the food from the recesses through playing with the device (50).

The recesses of the food retaining elements (59) comprise an angled or tapered side wall (60) and a base (62) to prevent food from falling into an interior of the mobile member (53). Hence, the food is retained in the food retaining element (59) until extracted by the animal rather than the food becoming inaccessible to the animal due to falling into the interior of the mobile member (53), which could frustrate the animal.

It will be appreciated that in other embodiments, the mobile member (53) can comprise two, three or more than four food retaining elements (59). It will also be appreciated that the food retaining elements (59) can be provided at different levels of the sloping surface (52) of the mobile member (53).

Figure 6:
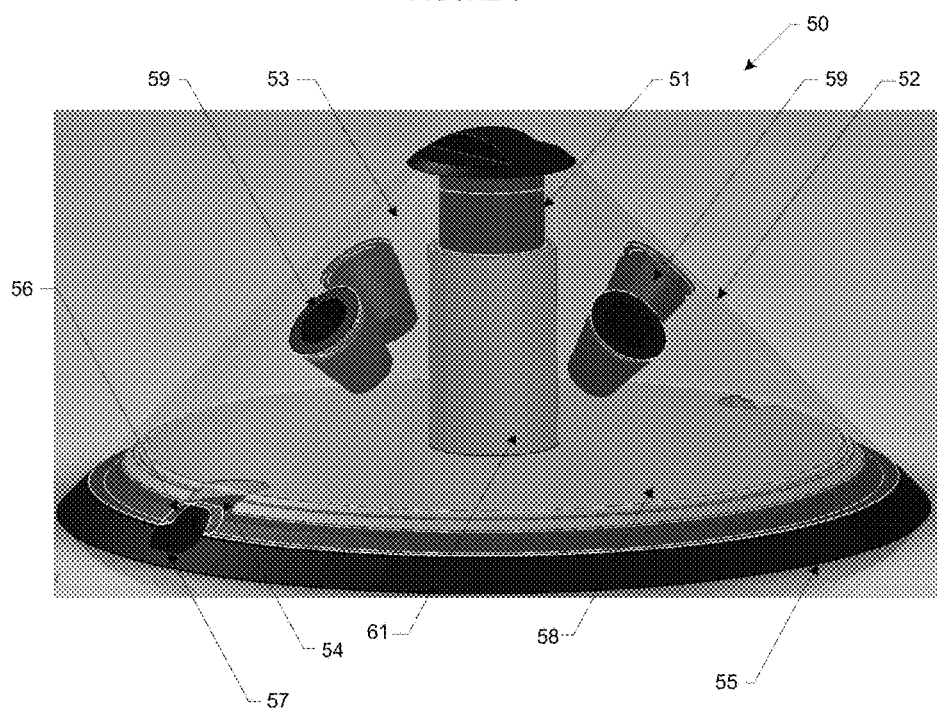
FIG. 6 illustrates a further embodiment of the device of the present invention having a mobile member with a substantially conical shape and two modes of release of food.
Figure 7:
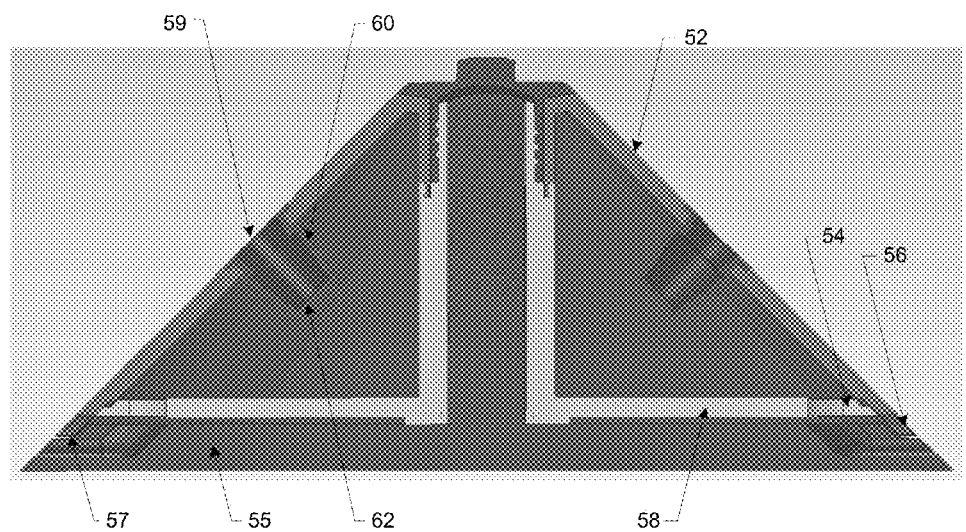
FIG. 7 is a side view of the embodiment shown in FIG. 6.

In the embodiments shown in FIGS. 6-11, a flat base (58) of the mobile member (53) comprises at least one aperture (54), which is permanently aligned with recess (56) in the sloping surface (52) of the mobile member (53). Flat base (55) of the support (51) comprises at least one channel (57), which can be aligned with aperture (54) and recess (56) of the mobile member (53), as shown in FIGS. 6 and 7, depending on a position of the mobile member (53) relative to the flat base (55). In some embodiments, the mobile member (53) is detachably mounted to the support (51) and the interior of the mobile member (53) is hollow, or partially hollow, which allows food to be stored inside the mobile member (53). As the animal plays with the device (50), the mobile member (53) rotates relative to the flat base (55) and therefore, intermittently, aperture (54) and recess (56) align with channel (57), which can allow the release of food from within the mobile member (53). Hence, this embodiment provides a second mode of food release which is unpredictable and therefore this embodiment of the device (50) further enhances stimulation for the animal.

In the embodiment shown in FIGS. 6-11, flat base (58) of the mobile member (53) comprises two apertures (54) and two respective recesses (56) for intermittent alignment with two channels (57) in the base (55) of the support (51). In the embodiment shown in FIGS. 6-11, each pair or set comprising an aperture (54) and respective recess (56) is on opposite sides of the mobile member (53), 180 degrees apart. Channels (57) in the base (55) of the support (51) are also on opposite sides of the base (55), 180 degrees apart. Therefore, when one of the apertures (54) and a respective recess (56) align with a channel (57), the other aperture (54) and respective recess (56) are simultaneously aligned with the other channel (57). This arrangement allows food within the hollow mobile member (53) to be released from either or both of the channels (57).

In other embodiments, more than two sets of apertures (54) and respective recesses (56) can be provided in the mobile member (53) and in some embodiments more than two channels (57) can be provided in the base (55) of the support (51). In such arrangements, food within the hollow mobile member (53) can be released from one, more than one or all of the channels (57) under suitable alignment conditions.

However, the number of channels (57) in the base (55) does not need to match the number of sets of apertures (54) and respective recesses (56) in the mobile member (53). For example, if four sets of apertures (54) and respective recesses (56) are provided in the mobile member (53) and two channels (57) are provided in the base (55) of the support (51), the sets of apertures (54) and respective recesses (56) will align with the channels (57) in the base (55) every quarter turn rather than every half turn. This arrangement increases the likelihood of food being released from within the mobile member (53) compared with the embodiment shown in FIGS. 6-11 in which the two sets of apertures (54) and respective recesses (56) align with the two channels (57) every half turn.

In some embodiments, the separation or spacing of the channels (57) around the circumference of the base (55) does not need to be the same as the separation or spacing of the apertures (54) and respective recesses (56) around the circumference of the mobile member (53). For example, in one embodiment, base (55) can comprise three channels (57) 120 degrees apart and mobile member (53) can comprise six sets of apertures (54) and respective recesses (56) 60 degrees apart. In this embodiment, only three of the six sets of apertures (54) and respective recesses (56) will be simultaneously aligned with three channels (57).

Figure 8:
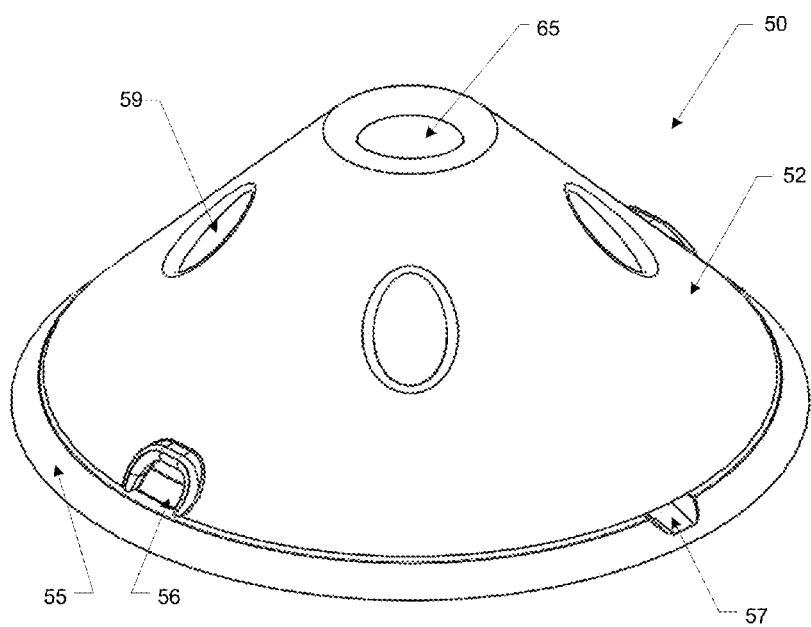
FIG. 8 is a perspective view of an embodiment similar to that shown in FIG. 6.
Figure 9:
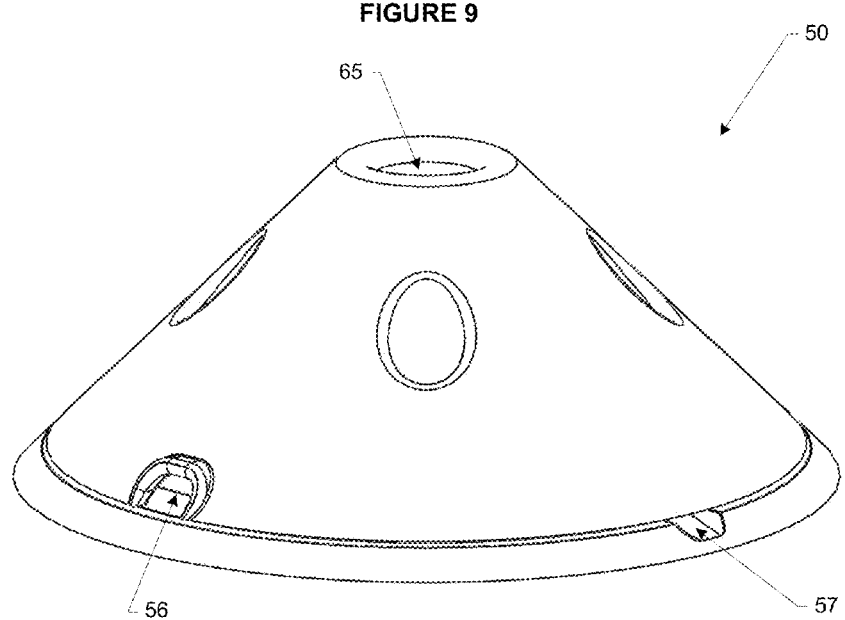
FIG. 9 is another perspective view of the embodiment shown in FIG. 8.

With reference to the embodiment shown in FIGS. 8 and 9, in some embodiments, a top of the mobile member (53) comprises an aperture (65) through which food can be inserted to place food into the hollow or partially hollow mobile member (53) for subsequent intermittent release through channels (57).

Figure 10:
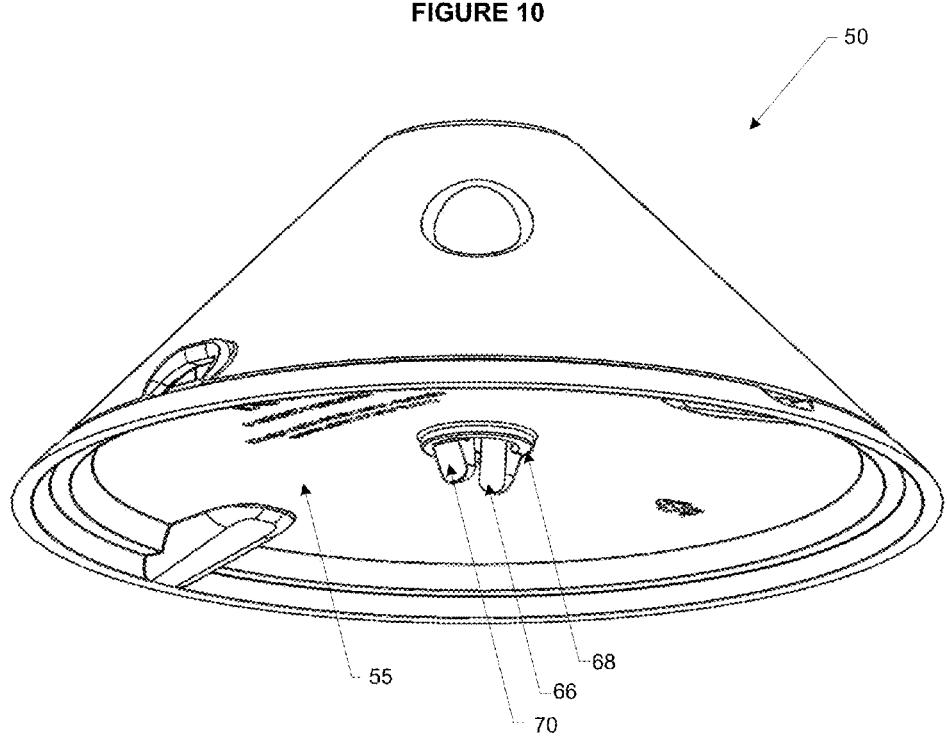
FIG. 10 is an underside perspective view of the embodiment shown in FIG. 8.
Figure 11:
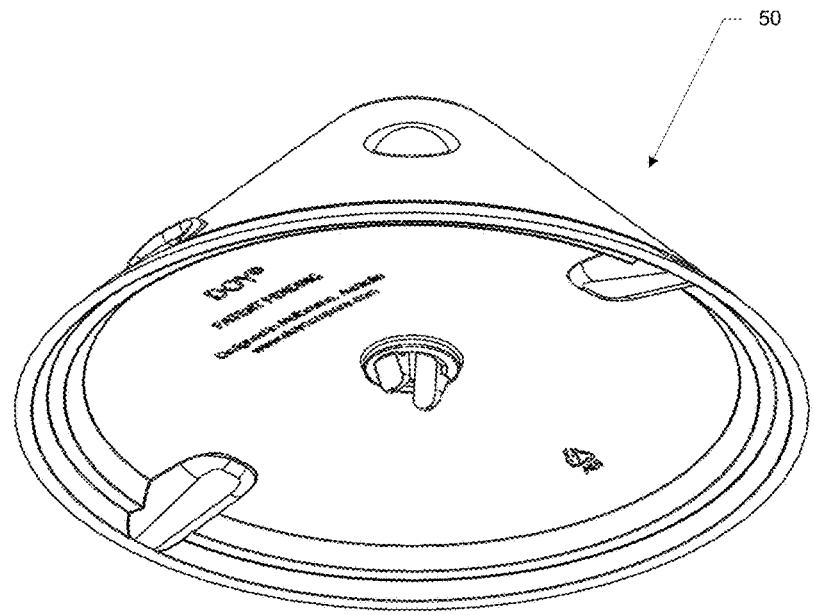
FIG. 11 is another underside perspective view of the embodiment shown in FIG. 8.

With reference to the embodiment shown in FIGS. 10 and 11, one end of the support (51) comprises a pair of arms 66, which pass through an aperture (68) in the base (55) to couple the support (51) to the base (55). Each arm 66 comprises a wedge (70) to prevent removal of the support (51) from the base (55), but the support (51) can rotate relative to the base (55). Pinching of the wedges (70) brings arms 66 closer together allowing removal of the support (51) from the aperture (68) in the base (55). In this embodiment, the mobile member (53) is coupled to the support (51) and the support (51) is rotatably coupled to the base (55) such that the mobile member (53) rotates relative to the base (55).

Figure 12:
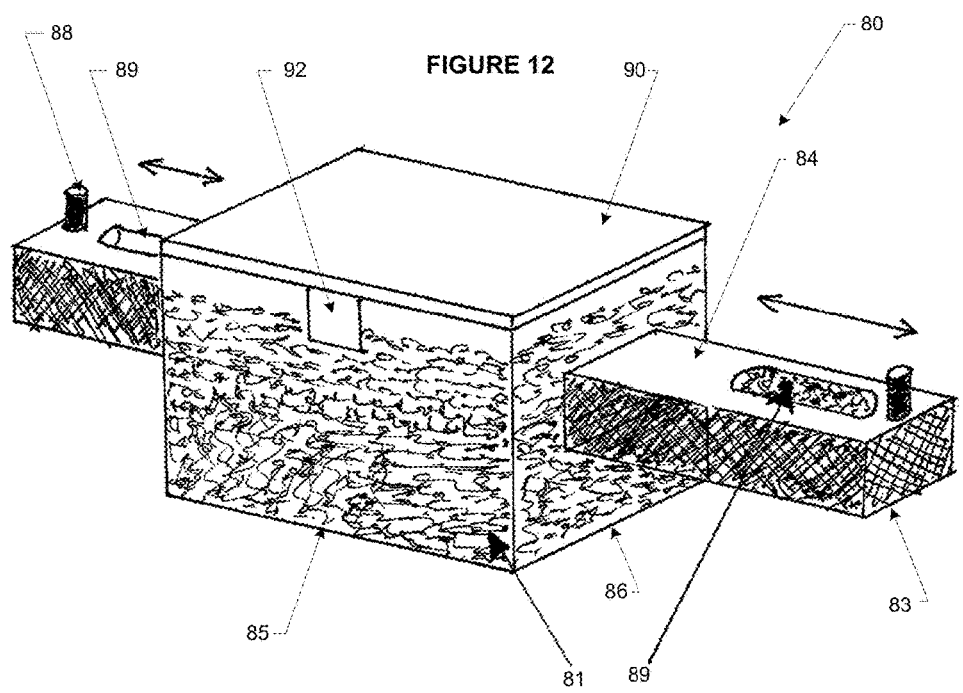
FIG. 12 is a perspective view of a yet further embodiment of the present invention.

With reference to FIG. 12, a further embodiment of an animal enrichment device (80) is shown, which comprises a base (85) and a support (81) coupled to the base (85). In this embodiment, the support (81) comprises four side walls (86), which in combination with the base (85) and a removable lid (90), form a box. Two opposing side walls of the box each comprise an aperture (84) through which a mobile member (83) projects. The mobile member (83) is elongate and in some embodiments can be approximately twice the width of the box. The mobile member (83) comprises at least one food retaining element (89). In the embodiment shown in FIG. 12, the mobile member (83) comprises two food retaining elements (89), one food retaining element (89) towards each end of the mobile member (83).

The mobile member (83) moves back and forth relative to the base (85) and the support (81) as indicated by the arrows when utilised by an animal attempting to extract food from the food retaining elements (89). An interior of the support (81) comprises a store of food. As shown in FIG. 12, one of the food retaining elements (89) is empty and the other food retaining element (89) comprises food. As the animal attempts to extract food from the food retaining element (89) comprising the food, the mobile member (83) moves such that the empty food retaining element (89) moves into the support (81). The empty food retaining element (89) thus collects food from the food store. When the animal has extracted the food from the other food retaining element (89), the mobile member (83) will eventually move in the opposite direction relative to the base (85) and the support (81) as the animal attempts to extract more food. The newly filled food retaining element (89) will eventually be exposed and the newly empty food retaining element (89) will move into the interior of the support (81) to be refilled. Hence, efforts by the animal to remove food from one of the food retaining elements (89) will cause the mobile member (83) to move relative to the base (85) and release food stored within the support (81) via the other food retaining element (89).

The mobile member (83) includes a stop (88) at each end to limit the movement of the mobile member (83) relative to the support (81) and prevent the mobile member (83) being extracted completely from the support (81). The device (80) also comprises a clip (92) to couple the device to an object, such as a tree or a fence.

Where dry food is stored within the mobile member or the support, the dry food moves around the interior of the mobile member or the support creating noises that encourage more animal activity and further enhance the animal's enjoyment.

Embodiments of the present invention are constructed from durable, all-weather materials making them suitable for long term use both indoors and outdoors. Dry treats are protected from the elements when stored within the mobile member.

Furthermore, embodiments of the present invention are not limited to being played with by one animal. Multiple animals can simultaneously play with the toy of the present invention.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the essential characteristics of the invention, it should be understood that the above described embodiments are not to limit the present invention unless otherwise specified, but rather should be construed broadly within the scope of the invention as defined in the appended claims. The described embodiments are to be considered in all respects as illustrative only and not restrictive.

Various modifications and equivalent arrangements are intended to be included within the scope of the invention and appended claims. Therefore, the specific embodiments are to be understood to be illustrative of the many ways in which the principles of the present invention may be practiced.

"Comprises/comprising" and "includes/including" when used in this specification is taken to specify the presence of stated features, integers, steps or components but does not preclude the presence or addition of one or more other features, integers, steps, components or groups thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

I claim:

1. An animal enrichment device comprising;
   a base comprising at least one channel;
   a support coupled to the base; and
   a mobile member coupled to the support, the mobile member comprising:
      a hollow, or partially hollow, interior to enable food to be stored within the mobile member;
      at least one food retaining element, each food retaining element comprising a recess on an outer sidewall surface of the mobile member in which food is inserted and retained, the recess having a recess sidewall and a recess base; and
      at least one aperture;
   wherein efforts by the animal to remove food from the recess of one of the at least one food retaining element will cause the mobile member to move relative to the base, thereby intermittently aligning the at least one channel in the base with the at least one aperture in the mobile member, and intermittently release food stored within the mobile member.

2. The device of claim 1, wherein the mobile member comprises a hollow central sleeve to rotatably mount the mobile member on the support.

3. The device of claim 1, wherein the support is rotatably coupled to the base.

4. The device of claim 3, wherein the base comprises an aperture through which the support passes to rotatably couple the support to the base.

5. The device of claim 4, wherein the support comprises a pair of arms which can be pinched to bring the arms closer together allowing removal of the support from the aperture in the base.

6. The device of claim 1, wherein the recess sidewall of the at least one food retaining element is tapered such that food can be wedged therein.

7. The device of claim 1, wherein the mobile member has a substantially conical shape.

8. The device of claim 7, wherein the at least one food retaining element is provided in a sloping sidewall surface of the mobile member.

9. The device of claim 8, wherein a plurality of food retaining elements are provided in the sloping sidewall of the mobile member at the same level or at different levels.

10. The device of claim 7, wherein the base is substantially circular.

11. The device of claim 10, wherein all of the apertures provided in the mobile member simultaneously align with respective channels in the base to allow food to be released from one, some or all of the channels.

12. The device of claim 10, wherein some of the apertures provided in the mobile member simultaneously align with respective channels in the base to allow food to be released from one or some of the channels.

13. The device of claim 10, wherein a spacing of the channels around a circumference of the base is the same as a spacing of the apertures around a circumference of the mobile member.

14. The device of claim 10, wherein a spacing of the channels around a circumference of the base is not the same as a spacing of the apertures around a circumference of the mobile member.

15. The device of claim 1, wherein a number of the channels provided in the base is the same as a number of the apertures provided in the mobile member.

16. The device of claim 1, wherein a number of channels provided in the base is not the same as the number of apertures provided in the mobile member.

17. The device of claim 1, wherein a top of the mobile member comprises an aperture through which food can be inserted to place food into the hollow or partially hollow mobile member.

18. An animal enrichment device comprising:
   a base, comprising at least one channel;
   a support coupled to the base; and
   a mobile member coupled to the support such that the mobile member is movable relative the base;
   wherein the mobile member comprises:
      at least one food retaining element comprising a recess on an outer sidewall surface of the mobile member in which food is inserted and retained to provide a first mode of food release, the recess having a recess sidewall and a recess base; and
      a hollow, or partially hollow, interior to enable food to be stored within the mobile member; and
      at least one aperture;
   wherein efforts by the animal to remove food from recess of one of the at least one food retaining element on the outer surface of the mobile member will cause the mobile member to move relative to the base, thereby intermittently aligning the at least one channel in the base with the at least one aperture in the mobile member, and intermittently release food stored within the mobile member.

* * * * *